United States Patent
Yokoyama et al.

(10) Patent No.: US 9,871,859 B2
(45) Date of Patent: Jan. 16, 2018

(54) CONTROL APPARATUS, CONTROL METHOD AND MEDIUM

(71) Applicant: NEC Corporation, Tokyo (JP)

(72) Inventors: Yuji Yokoyama, Tokyo (JP); Fei Gao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 20 days.

(21) Appl. No.: 14/874,412

(22) Filed: Oct. 3, 2015

(65) Prior Publication Data

US 2016/0112330 A1    Apr. 21, 2016

(30) Foreign Application Priority Data

Oct. 15, 2014  (JP) ................... 2014-210527

(51) Int. Cl.
*H04L 12/28* (2006.01)
*H04L 12/56* (2006.01)
*H04L 29/08* (2006.01)
*H04L 12/715* (2013.01)

(52) U.S. Cl.
CPC .......... *H04L 67/1074* (2013.01); *H04L 45/64* (2013.01); *H04L 67/02* (2013.01); *H04L 67/125* (2013.01)

(58) Field of Classification Search
CPC ... H04L 67/1074; H04L 67/02; H04L 67/125; H04L 45/64
USPC ................. 370/392, 252, 254, 389
See application file for complete search history.

(56) References Cited

U.S. PATENT DOCUMENTS

| | | | |
|---|---|---|---|
| 2013/0230047 A1* | 9/2013 | Subrahmaniam ... | H04L 47/2441 370/392 |
| 2013/0315248 A1* | 11/2013 | Morimoto .......... | H04L 12/4633 370/392 |
| 2014/0177634 A1* | 6/2014 | Jiang ...................... | H04L 45/64 370/392 |
| 2014/0233577 A1* | 8/2014 | Hatano ................... | H04L 45/64 370/400 |
| 2015/0194215 A1* | 7/2015 | Douglas ................ | G11C 15/04 711/108 |

(Continued)

FOREIGN PATENT DOCUMENTS

JP    2011-166384 A    8/2011

*Primary Examiner* — Chuong T Ho
(74) *Attorney, Agent, or Firm* — McGinn IP Law Group, PLLC.

(57) ABSTRACT

A first control apparatus according to the present invention includes: a first receiving unit which receives a second message from any one of switch apparatuses of an Open-Flow network which is a connection path connecting a terminal apparatus with a communication destination apparatus; a first receiving packet processing unit which processes the second message; a first application executing unit which executes a first application corresponding to the second message; a first message generating unit which receives messages from the first receiving packet processing unit and the first application executing unit, and generates a first message; a first message receiving unit which receives a first message from another first control apparatus; a first determination unit which selects the first message received from the first message generating unit or the first message received from the first message receiving unit; and a first sending unit which sends the selected first message.

4 Claims, 10 Drawing Sheets

(56) References Cited

U.S. PATENT DOCUMENTS

| | | | |
|---|---|---|---|
| 2015/0263939 A1* | 9/2015 | Hasegawa | H04L 45/38 370/389 |
| 2016/0006769 A1* | 1/2016 | Jain | H04L 12/4641 726/1 |
| 2016/0065468 A1* | 3/2016 | Jiang | H04L 45/64 370/392 |
| 2016/0198025 A1* | 7/2016 | Morimoto | H04L 12/4633 370/392 |

* cited by examiner

CONTROL APPARATUS, CONTROL METHOD AND MEDIUM

INCORPORATION BY REFERENCE

This application is based upon and claims the benefit of priority from Japanese Patent Application No. 2014-210527, filed on Oct. 15, 2014, the disclosure of which is incorporated herein in its entirety by reference.

TECHNICAL FIELD

The present invention relates to control of an information processing system, and particularly relates to a control apparatus, an information processing system, a control method and a medium which control a communication path of information.

BACKGROUND ART

In general, a plurality of switches on a path determine the path from a sending source of a packet to a sending destination of the packet, and process packet-transfer. But, as an information processing system becomes diversified and scaled up, it is necessary to determine the path, which matches quickly with a change in a network configuration, adequately and flexibly. Then, as an art that, in a computer network, an external controller carries out one-dimensional control for a transfer operation of each switch, OpenFlow (OF) has been proposed (for example, refer to Japanese Patent Laid-open No. 2011-166384).

According to OpenFlow, an OpenFlow Switch (OFS) carries out an operation, which is set in Action, to a packet including Match Field which matches with a condition. Match Field has composition using a network hierarchy including Layer 1 (L1) to Layer 4 (L4). When receiving an unknown Match Field (unknown packet), OFS sends the packet to OpenFlow Controller (OFC) through OF-Ch (OpenFlow Channel). OFC outputs a flow to an adequate OFS on the basis of a packet destination. Then, OFC registers the flow with a flow table of each OFS by using the flow-mod message. Once the flow is registered, with reference to the registered flow table, OFS carries out communication related to a flow which is inputted into Ingress (entrance switch) at a next time or consequent times and which matches with a condition of the flow table. That is, OFS communicates directly without passing through OFC. According to OpenFlow, it is possible to flexibly carry out network control such as path control and load balance on the basis of OFC's setting the flow which is applied to OFS.

That is, the OpenFlow protocol determines the flow with reference to contents of the packet which exist in L1 to L4. For example, according to OpenFlow, OFS transfers fields (Match Field) of L1 to L4 of a communication packet to OFC by using the Packet-in (P-in) message. Then, OFC inputs a determined flow into OFS. On the basis of the above-mentioned operation, OpenFlow realizes the flexible network control, for example, network control of carrying out the adequate path control and distributing network traffic.

SUMMARY

An example of an object of the present invention is to provide a control apparatus, an information processing system, a control method and a storage medium which set the flow of OpenFlow adequately.

A first control apparatus according to an aspect of the present invention includes: a first receiving unit which receives a second message from any one of a plurality of switch apparatuses which constructs an OpenFlow network which is a connection path which connects a terminal apparatus which is a sending source of information with a communication destination apparatus which is a destination of the information; a first receiving packet processing unit which processes the second message; a first application executing unit which executes a first application which is corresponding to the second message; a first message generating unit which receives a message from the first receiving packet processing unit and a message from the first application executing unit, and generates a first message; a first message receiving unit which receives a first message from another first control apparatus; a first determination unit which selects any one of the first message which is received from the first message generating unit and the first message which is received from the first message receiving unit on the basis of the first message which is received from the first message generating unit; and a first sending unit which sends the first message which is selected by the first determination unit.

An information processing system according to an aspect of the present invention includes: a terminal apparatus which is a communication source of information; a communication destination apparatus which is a communication destination of the information; a plurality of switch apparatuses which constitutes an OpenFlow network which is a path between the terminal apparatus and the communication destination apparatus; a plurality of first control apparatuses each of which executes a predetermined application, generates a first message which is used for control of the OpenFlow network on the basis of a result of executing the application, and sends the first message logically in series in an order of priority of the application; and a second control apparatus which sets an OpenFlow network function to the switch apparatus on the basis of the first message.

A control method according to an aspect of the present invention, includes: receiving a second message from any one of a plurality of switch apparatuses which constructs an OpenFlow network which is a connection path which connects a terminal apparatus which is a sending source of information with a communication destination apparatus which is a destination of the information; processing the second message; executing a first application which is corresponding to the second message; receiving a message including a result of processing the second message and a message including a result of the application, and generating a first message; receiving a first message from another first control apparatus; selecting any one of a first message which is received from the other first control apparatus and the first message which is generated on the basis of the generated first message; and sending the selected first message.

A computer readable non-transitory medium according to an aspect of the present invention, the medium embodying a program, the program causing a computer to perform a method, the method includes: receiving a second message from any one of a plurality of switch apparatuses which constructs an OpenFlow network which is a connection path which connects a terminal apparatus which is a sending source of information with a communication destination apparatus which is a destination of the information; processing the second message; executing a first application which is corresponding to the second message; receiving a message including a result of processing the second message and a message including a result of the application, and generating a first message; receiving a first message from another first control apparatus; selecting any one of a first message which is received from the other first control apparatus and the first message which is generated on the basis of the generated first message; and sending the selected first message.

BRIEF DESCRIPTION OF THE DRAWINGS

Exemplary features and advantages of the present invention will become apparent from the following detailed description when taken with the accompanying drawings in which.

EXEMPLARY EMBODIMENT

Next, an exemplary embodiment of the present invention will be explained with reference to a drawing.

Each drawing explains the exemplary embodiment of the present invention. But, the present invention is not limited to description of each drawing. Moreover, the same component of each drawing has the same code, and repeated explanation on the component may be omitted in some cases.

Description on a configuration of a part, which is described in the following explanation and which is not related to explanation of the present invention, may be omitted and may not be shown in a drawing in some cases.

Firstly, terminology and abbreviated words (acronym), which are used in explanation of the present exemplary embodiment, are classified and listed.

OF: OpenFlow
OFC: OpenFlow Controller
OFS: OpenFlow Switch
P-in: Packet-in message of OpenFlow protocol. Meaning of 'P-in' is not limited to P-in message. That is, 'P-in' or 'do P-in' means a function to send a Packet-in message.

OFI: OpenFlow Installer
OFN: OpenFlow Network. The OpenFlow network is Core Network of OpenFlow which connects OFSs.
Ingress: entrance switch to OpenFlow Network when viewing from a communication terminal. An exit switch from OpenFlow Network is called Egress.
App: Application
AppSV: Application Server
OFASC: Open Flow Application Server Controller (AppSV+OFC)
OFCI: Open Flow Controller Installer (OFC+OFI)
OF-Ch: OpenFlow Channel. The OpenFlow Channel is a control line of OpenFlow which connects OFS and OFC. In the following exemplary embodiment, the OF-Ch connects, for example, OFS, OFASC and OFCI.
Cookie: information left by apparatus which connects through network <First Exemplary Embodiment>

An outline of a first exemplary embodiment will be explained in the following.

[Explanation on Configuration]

A configuration of an information processing system according to the first exemplary embodiment of the present invention will be explained in the following.

Firstly, an information processing system 101, which is related to the first exemplary embodiment of the present invention, which is based on OF, and which includes one OFASC (OpenFlow Application Server Controller), will be explained in the following.

Figure 1:
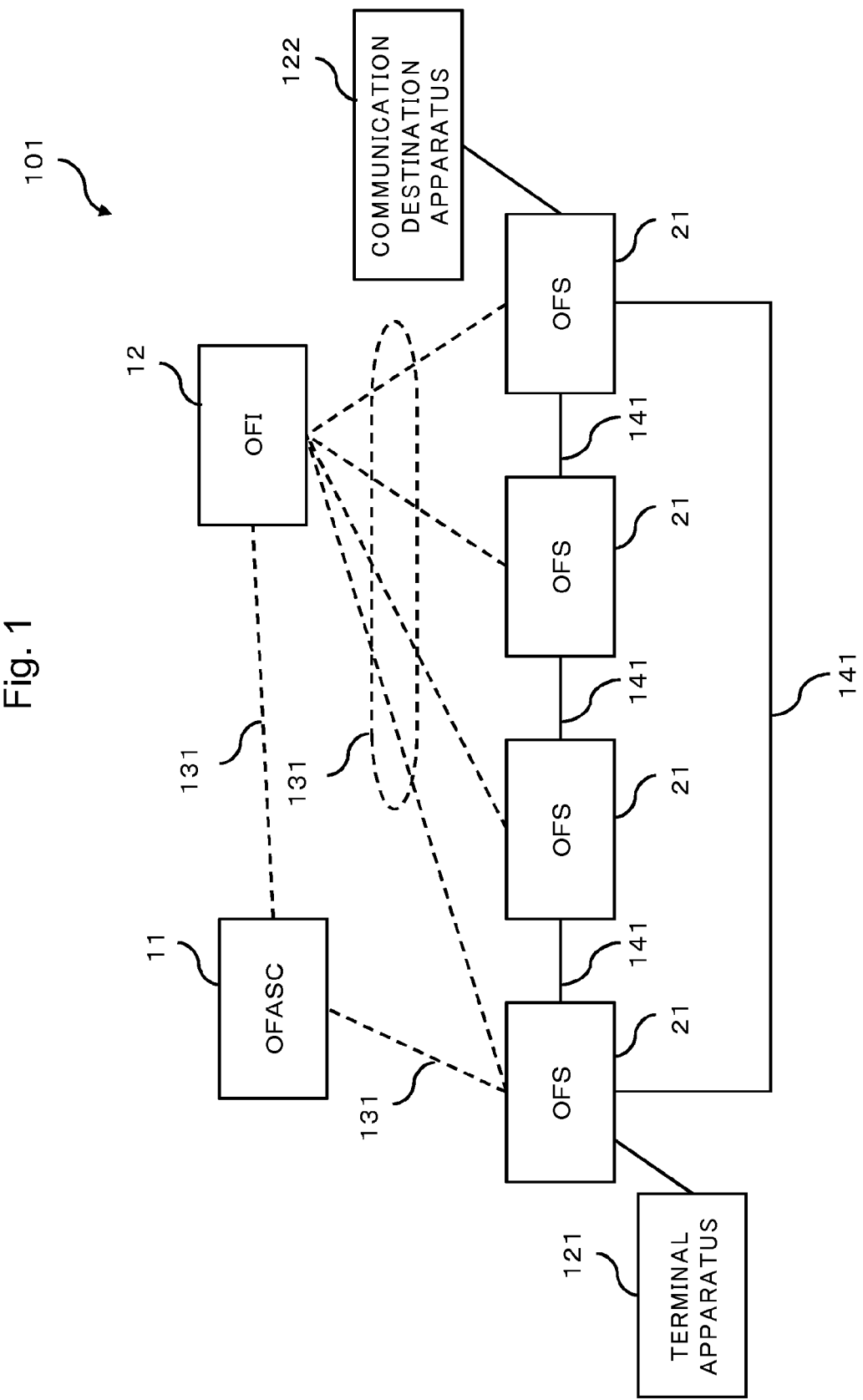
FIG. 1 is a block diagram showing an example of a configuration of an information processing system which is related to a first exemplary embodiment.

FIG. 1 is a block diagram showing an example of the information processing system 101 which is related to the first exemplary embodiment.

As shown in FIG. 1, the information processing system 101 realizes an OpenFlow (OF) environment in which a terminal apparatus 121 and a communication destination apparatus 122 are connected with each other. Therefore, the information processing system 101 includes one OFASC 11, OFI (OpenFlow Installer) 12, and a plurality of OFSs (OpenFlow Switch) 21.

Since an information processing equipment, which can carry out usual communication, can be applied to the terminal apparatus 121 and the communication destination apparatus 122, detailed explanation on the terminal apparatus 121 and the communication destination apparatus 122 is omitted.

Moreover, the OFS 21 is a switch which realizes the OF environment. The OFSs 21 are connected with each other through a predetermined network, and are included in an OFN (OpenFlow Network) 141 which is placed as the OF environment. Therefore, the OFS 21 is also a switch apparatus or a switch means. Since a usual OpenFlow switch can be applied to the OFS 21, detailed explanation of the OFS 21 is omitted.

The OFASC 11 has functions of AppSV (Application Server) and OFC (OpenFlow Controller) of OpenFlow. The AppSV is an apparatus which carries out a predetermined application and realizes a predetermined function. Moreover, the OFC is an apparatus which controls a flow in OpenFlow. Therefore, the OFASC 11 is also a function processing control apparatus or a function processing control means. Alternatively, the OFASC 11 is called also a first control apparatus.

The OFASC 11 transfers a flow, which is a result of processing, to the OFI 12 through OF-Ch (OpenFlow Channel) 131.

The OFI 12 registers the flow with the OFS 21. Therefore, the OFI 12 is also a setting apparatus or a setting means.

On the basis of the above-mentioned operation, the information processing system 101 can make the OFS 21 (that is, the OFN 141) learn a processing result acquired by the function which the OFASC 11 has as the AppSV.

Next, an information processing system 102, which is related to the exemplary embodiment of the present invention and which includes a plurality of the OFASCs 11, will be explained.

Figure 2:
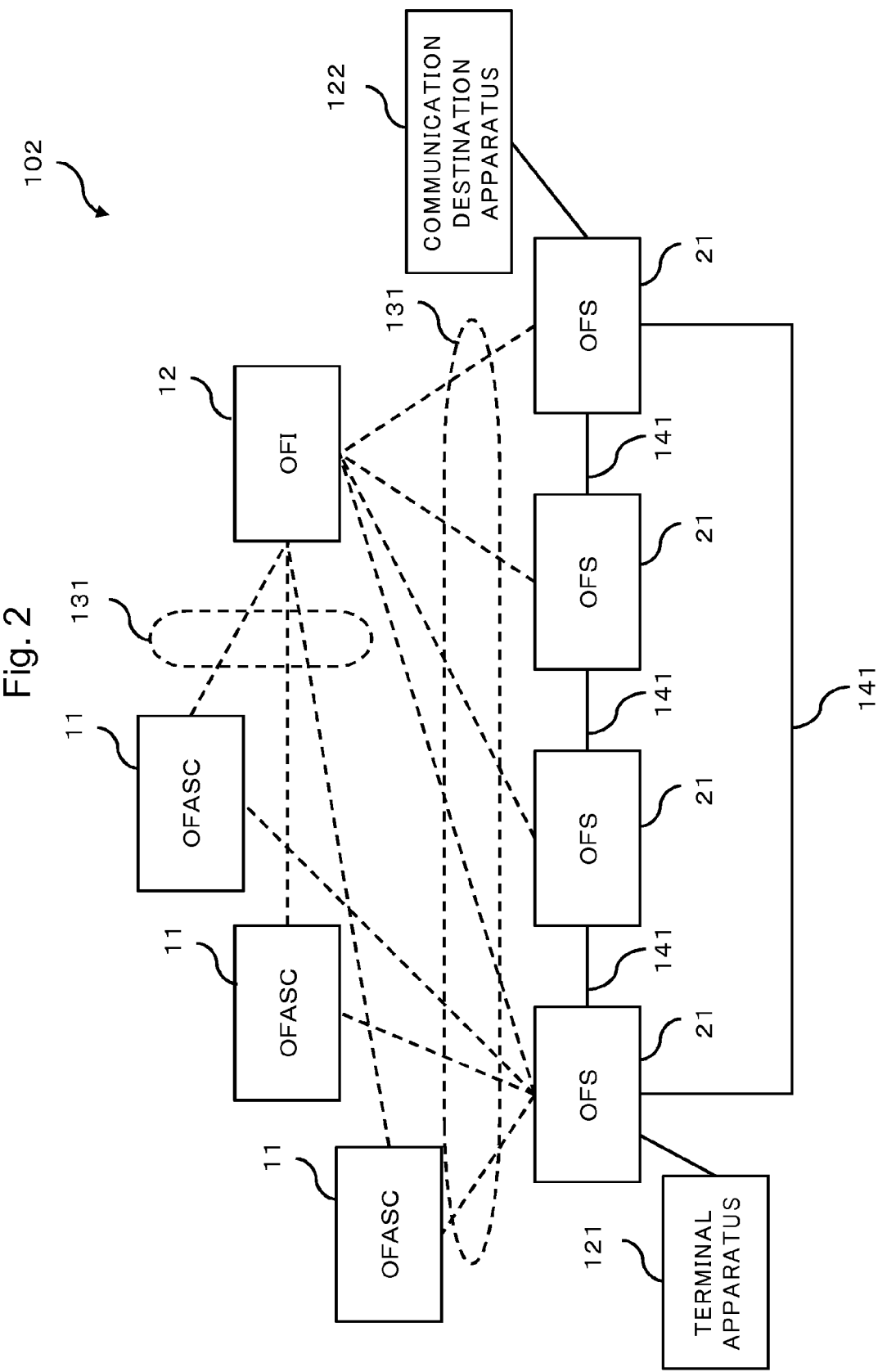
FIG. 2 is a block diagram showing an example of the configuration of the information processing system which is related to the first exemplary embodiment.

FIG. 2 is a diagram showing an example of a configuration of the information processing system 102 which is related to the first exemplary embodiment and which includes a plurality of the OFASCs 11.

As shown in FIG. 2, in the case of an OF environment in which a plurality of the OFASCs 11 exist, each of the OFASCs 11 individually carries out processing which is corresponding one P-in (Packet-in message). As a result, process results, which are outputted by the OFASCs 11 respectively, arrive at the OFI 12 at times different each other (with no timing adjustment) as shown in FIG. 2.

In other words, one P-in is inputted into a plurality of the OFASCs 11. Then, flow setting requests, which request flows different each other and which are issued by a plurality of the OFASCs 11, arrive at the OFI 12 individually. In this case, there is a possibility in that some flow settings are contradictory each other or unfair.

An information processing system 100 according to the first exemplary embodiment of the present invention solves the above-mentioned problem.

Figure 3:
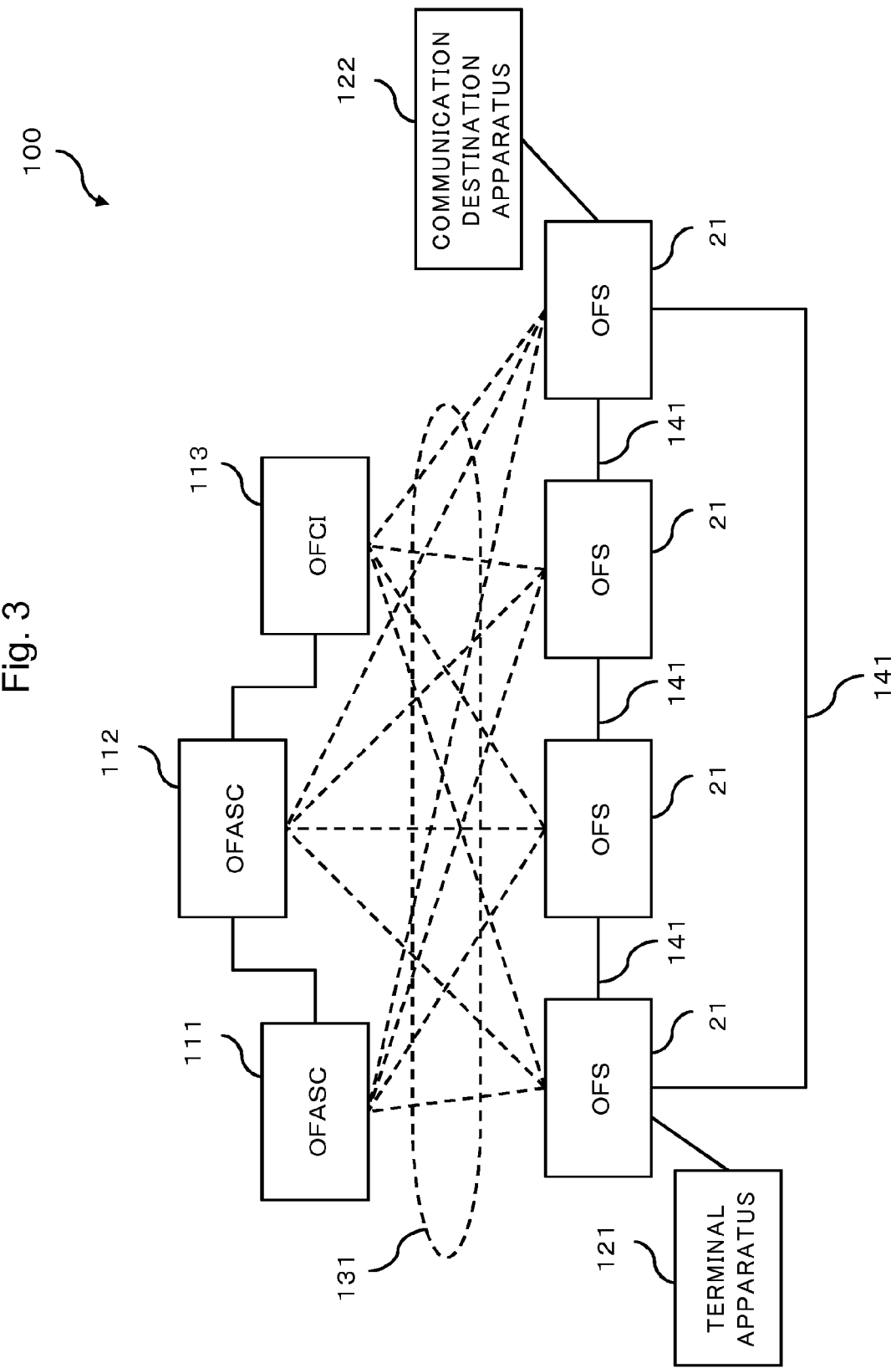
FIG. 3 is a block diagram showing an example of a configuration of an information processing system according to the first exemplary embodiment of the present invention.

FIG. 3 is a block diagram showing an example of a configuration of the information processing system 100 according to the first exemplary embodiment of the present invention.

An outline of the information processing system 100 will be explained in the following.

The information processing system 100 according to the first exemplary embodiment gives priority to flows which functions of the OFASC 111 and the OFASC 112 working as the AppSV intend to register. Then, the OFASC 111 and the OFASC 112 are connected with each other by using of the bucket-brigade method in an order of the priority. Furthermore, in the case that there are flow setting requests which are processing results of the OFASC 111 and the OFASC 112 working as the AppSV, each of the OFASC 111 and the OFASC 112 sends information, which identifies an own apparatus, to the OFCI (Open Flow Controller Installer) 113. More specifically, the OFASC 111 and the OFASC 112 add a piece of information, which identifies the OFASC 111 and the OFASC 112 respectively, to cookie information of the flow-mod message which is issued to the OFCI 113. Then, the OFCI 113 manages the flow which is inputted into the OFS 21. On the basis of the above-mentioned configuration, the information processing system 100 prevents the contradictory flow from being registered with the OFS 21.

Next, details of the information processing system 100 according to the first exemplary embodiment, which includes the above-mentioned the OFASC 11, will be explained.

Firstly, the configuration of the information processing system 100 will be explained in the following.

As shown in FIG. 3, the information processing system 100 includes a plurality of the OFSs 21, the OFCI 113, the OFASC 111, and the OFASC 112. Moreover, the information processing system 100 includes one or more terminal apparatuses 121 and one or more communication destination apparatuses 122 which communicate respectively by using the OF environment.

The OFASC 111 and the OFASC 112 shown in FIG. 3 have the same configuration and the same function. For convenience of explanation, the OFASC 111 is defined as a first OFASC, and the OFASC 112 is defined as a second OFASC or subsequent OFASCs. However, the information processing system 100 may include one OFASC 112 or a plurality of OFASCs 112.

Moreover, number of the OFSs 21 shown in FIG. 3 is one example. The information processing system 100 may include the OFSs 21 whose number is less than 4 or more than 4.

The OFS 21 is connected with the OFASC 111, the OFASC 112, and the OFCI 113 through the OF-Ch 131. Moreover, the OFCs 21 are connected with each other by using a predetermined communication means to realize the OFN 141. A form of mutual connection among the OFSs 21 has no limitation, and various forms are applicable. FIG. 3 exemplifies a form of loop connection which is acquired by drawing two connection lines from one OFS 21.

As shown a network configuration in FIG. 3, the OFASC 111 and the OFASC 112 are connected with each other logically in series. Specifically, the OFASC 111 is connected with the OFASC 112, and furthermore the OFASC 112 is connected with the OFCI 113. These connections are realized through the OF-Ch 131. Moreover, the OFASC 111 and the OFASC 112 are connected with each other in series in an order of low priority of the flow which each of the OFASC 111 and the OFASC 112 working as the AppSV inputs into the OFS 21. That is, priority given to the AppSV of the OFASC 111 is lower than priority given to the AppSV of the OFASC 112.

In the following explanation, 'Stateful Firewall (FW)' and 'Load Balancer' are assumed to be Apps (Applications) each of which realizes a function of AppSV in the explanation of the present exemplary embodiment. In this case, Stateful FW, which is more important from a view point of security, has higher priority than Load Balancer has. Therefore, the OFASC 111 which is the first OFASC, is equipped with Load Balancer. Moreover, the OFASC 112 is equipped with Stateful FW. These Apps will be described later.

The OFCI 113 has an OFC function for managing OFN in the usual OF environment, and an OFI function for registering a flow which is requested by the OFASC 111. Therefore, the OFCI 113 is also a control setting apparatus or a control setting means. Alternatively, the OFCI 113 is called also a second control apparatus.

[Explanation on Operation]

Next, an operation of the information processing system 100 will be explained.

As OF protocol which is used in explanation on the following operation, the specification of OpenFlow 1.3 is used.

(Way to Use Cookie)

According to OpenFlow 1.3, a cookie value of 'flow-mod message' is 64 bits. A user can freely define a way for using the cookie value. In the present exemplary embodiment, it is assumed that 16 bits which are a head part of 64 bits are used for identifying the OFASC 111 and the OFASC 112, and 48 bits which are a latter part of 64 bits are used for identifying the flow.

Definition of the bits for identifying OFASCs is that a first bit is used for identifying a first OFASC, and a second bit is used for identifying a second OFASC, and a n-th bit is used for identifying a n-th OFASC ($1 \leq n \leq 16$). That is, in the explanation of the present exemplary embodiment, (since the first OFASC is the OFASC 111), maximum number of the OFASCs 112 is 15. However, this is mere example. The information processing system 100 may include the OFASCs 112 whose number is less than 15, and may include the OFASCs 112 whose number is more than 15.

Moreover, 48 bits, which are the latter part of 64 bits, identifies the inputted flow uniquely. Therefore, it is assumed that 48 bits which are the latter part of 64 bits, for example, are calculated on the basis of the inputted flow by using the Hash function.

(First OFASC 111)

An operation of the first OFASC 111 will be explained in the following.

When the terminal apparatus 121 starts communication with the communication destination apparatus 122, a communication packet is inputted from the terminal apparatus 121 into the first OFS 21. This OFS 21 is corresponding to 'Ingress'. When the OFS 21 receives a packet including Match Field which does not exist in a flow table, the OFS 21 performs 'P-in' to the OFASC 111, the OFASC 112, and the OFCI 113.

Figure 4:
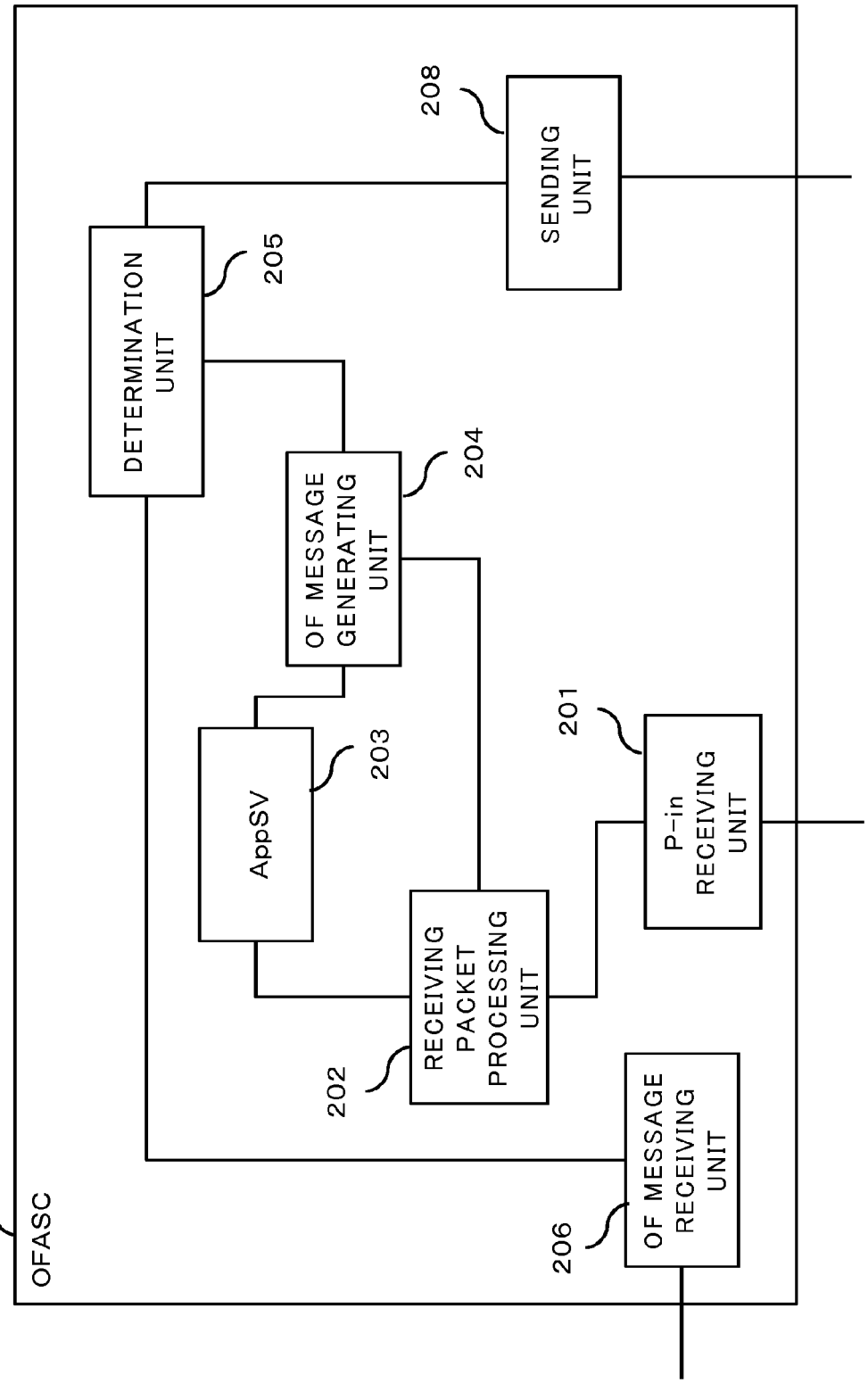
FIG. 4 is a block diagram showing an example of a configuration of OFASC according to the first exemplary embodiment.

FIG. 4 is a block diagram showing an example of a configuration of the OFASC 111 according to the present exemplary embodiment.

As shown in FIG. 4, the OFASC 111 includes a P-in receiving unit 201, a receiving packet processing unit 202, AppSV 203, an OF (OpenFlow) message generating unit 204, a determination unit 205, an OF message receiving unit 206, and a sending unit 208.

The P-in receiving unit 201 receives a P-in (a P-in packet). The P-in receiving unit 201 transfers the received P-in to the receiving packet processing unit 202. For example, the P-in receiving unit 201 extracts a data portion of the P-in packet, and transfers the data portion to the receiving packet processing unit 202. The P-in receiving unit 201 may receive another message. Therefore, the P-in receiving unit 201 is also a receiving unit or a receiving means.

The receiving packet processing unit 202 determines contents of the data portion. When the contents (for example, L4 data portion) are corresponding to a port of the AppSV 203 of the own apparatus, the receiving packet processing unit 202 transfers the received message to the AppSV 203. When there is no L4 data portion or there is no corresponding port, the receiving packet processing unit 202 transfers the received message to the OF message generating unit 204.

The AppSV 203 carries out a usual application processing as a usual AppSV of OpenFlow. Therefore, the AppSV 203 is also an application executing unit or an application executing means. The AppSV 203 transfers a result of the processing to the OF message generating unit 204.

The OF message generating unit 204 carries out one processing when the AppSV 203 carries out the application processing, and carries out another processing when the AppSV 203 does not carry out the application processing. When the AppSV 203 carries out the application processing, the OF message generating unit 204 embeds a result of the processing in the flow-mod message, and transfers the flow-mod message to the determination unit 205. At this time, the OF message generating unit 204 sets a head bit of cookie so as to be able to identify the OFASC 111. On the other hand, when the AppSV 203 does not carry out the application processing, the OF message generating unit 204 carries out a processing, which is corresponding to a case of receiving the packet directly from the receiving packet processing unit 202, on the basis of the message. Specifically, since the OF message generating unit 204 does not receive the result of the processing from the AppSV 203, the OF message generating unit 204 transfers the flow-mod message, which indicates that nothing is done, to the determination unit 205. Hereinafter, the flow-mod message, which indicates that nothing is done, is called 'null flow-mod'. The null flow-mod has no particular limitation. The null flow-mod may be determined to the OFASC 111, the OFASC 112, and the OFCI 113 in advance. For example, the null flow-mod may be a message which designates the command 'OFPFC_MODIFY_STRICT' in the specification of OpenFlow, and sets all of fields of ofc_match structure to '0'. The OF message generating unit 204 is also a message generating unit or a message generating means.

The determination unit 205 determines whether the message is transferred from the OF message generating unit 204 or from the OF message generating unit 206. The OFASC 111, which is the first OFASC, has no front OFASC. Therefore, the OF message generating unit 206 does not receive the message. Accordingly, the determination unit 205 sends the message, which is received from the OF message generating unit 204, to the OFASC 112 through the sending unit 208.

(Second OFASC 112 or Subsequent OFASCs 112)

The information processing system 100 of the present exemplary embodiment operates so as to maintain consistency of the processing from doing P-in to the OFASC 112 (and OFASC 111) until registering the flow-mod message with the OFS 21.

Therefore, the OFASC 112, which is the second OFASC or subsequent OFASCs, carries out a processing, which uses the flow-mod message sent by the just front OFASC (in FIG. 3, OFASC 111), in addition to the process which uses the message of the own apparatus.

An operation of the OFASC 112 will be explained in the following in detail.

A configuration of the OFASC 112 is the same configuration as the OFASC 111 shown in FIG. 4 has. Moreover, operations of the P-in receiving unit 201 to the OF message generating unit 204 are the same as ones of the OFASC 111.

The P-in receiving unit 201 extracts a data portion of a received P-in (P-in packet), and transfers the data portion to the receiving packet processing unit 202.

The receiving packet processing unit 202 determines information of the received message. Then, for example, when a L4 portion of the information of the message is corresponding to the AppSV 203, the receiving packet processing unit 202 transfers the message to the AppSV 203. On the other hand, when the L4 portion is not corresponding to the AppSV 203, the receiving packet processing unit 202 transfers the message to the OF message generating unit 204.

The AppSV 203 transfers a result of the process, which is carried out by the application, to the OF message generating unit 204.

The OF message generating unit 204 generates the flow-mod message which is corresponding to the message received from the AppSV 203 or the receiving packet processing unit 202. For example, when receiving the message from the receiving packet processing unit 202 (that is, when the AppSV 203 does not carry out the processing), the OF message generating unit 204 transfers the null flow-mod message to the determination unit 205. On the other hand, when the AppSV 203 carries out the processing, the OF message generating unit 204 sets an n-th (in this case, n=2) bit of cookie to generate a message. The OF message generating unit 204 sends a result to the determination unit 205.

The OF message receiving unit 206 receives a message from the OFASC 111 (that is, just front OFASC). Then, the OF message receiving unit 206 transfers the received message to the determination unit 205. The OF message receiving unit 206 is also a message receiving unit or a message receiving means.

The determination unit 205 receives the message from the OF message receiving unit 206, and receives the other message from the OF message generating unit 204, and carries out the following processing. That is, when the message received from the OF message generating unit 204 is a valid message, the determination unit 205 sends the message, which is received from the OF message generating unit 204, through the sending unit. Moreover, the determination unit 205 discards the message received from the OFASC 111. On the other hand, when the message received from the OF message generating unit 204 is the null flow-mod message, the determination unit 205 sends the message, which is received from the OF message receiving unit 206, through the sending unit 208. That is, when the message of the own apparatus is validly processed, the determination unit 205 selects and sends the message of the own apparatus. On the other hand, when the message of the own apparatus is invalid, the determination unit 205 sends the message of the just front apparatus.

(OFCI 113)

Next, an operation of the OFCI 113 will be explained.

Figure 5:
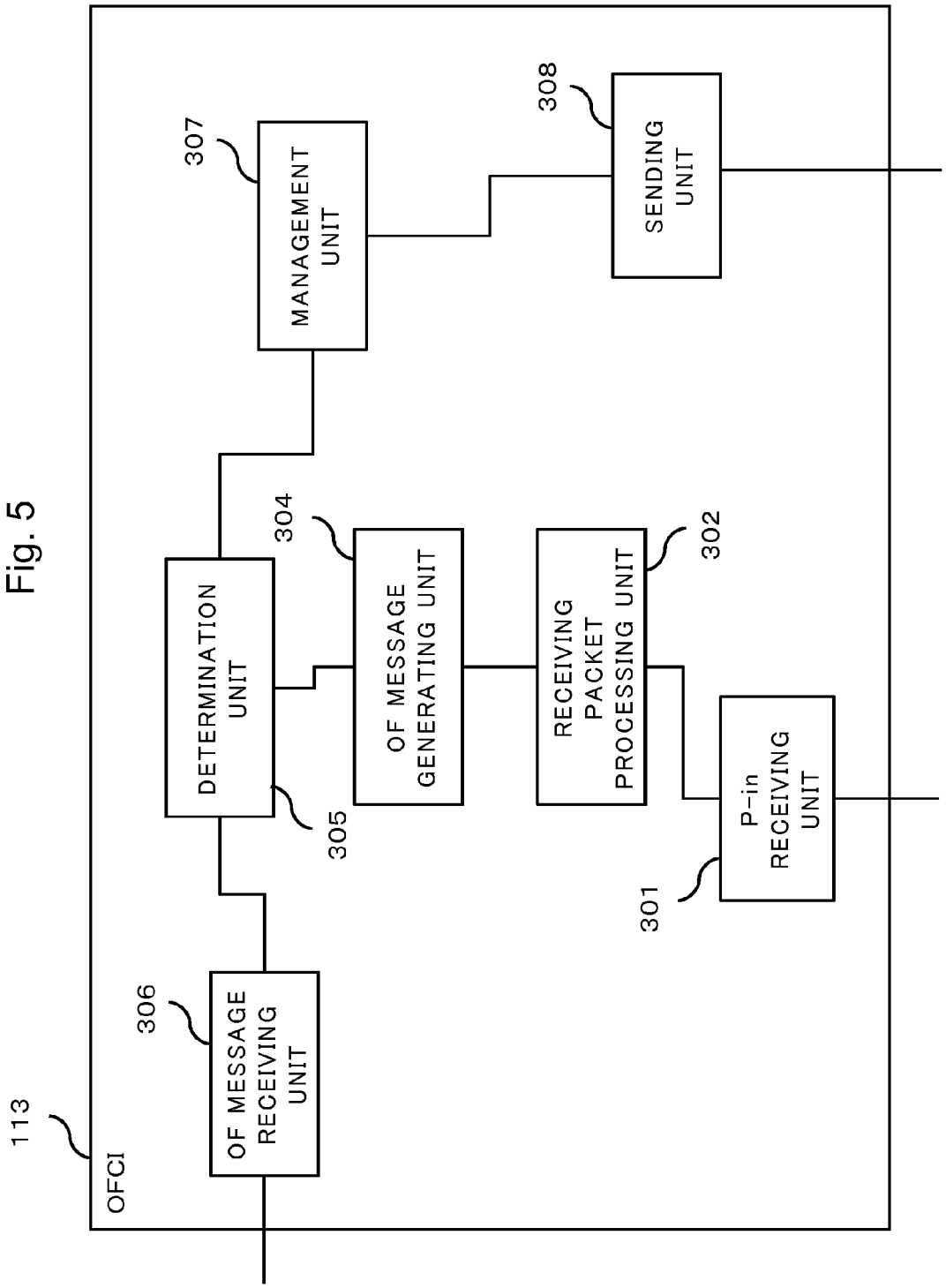
FIG. 5 is a block diagram showing an example of a configuration of OFCI according to the first exemplary embodiment.

FIG. 5 is a block diagram showing an example of a configuration of the OFCI 113 of the present exemplary embodiment.

The OFCI 113 includes a P-in receiving unit 301, a receiving packet processing unit 302, an OF message generating unit 304, a determination unit 305, an OF message receiving unit 306, a management unit 307, and a sending unit 308.

A port number (L4) of an application, which is used in OFASC (the OFASC 111 and the OFASC 112) connected with the OFCI 113, is registered with the OFCI 113 in advance.

The P-in receiving unit 301 receives a P-in (a P-in packet). Then, the P-in receiving unit 301 transfers the received P-in to the receiving packet processing unit 302. Similarly to the P-in receiving unit 201, the P-in receiving unit 301 is also a receiving unit or a receiving means.

The receiving packet processing unit 302 extracts a data portion of the received P-in packet, and checks whether the data portion is a predetermined message which the OFASC 111 (or the OFASC 112) should process or not.

When the data portion is the predetermined message which the OFASC 111 or the OFASC 112 should process, the receiving packet processing unit 302 transfers a null message to the OF message generating unit 304. The OF message generating unit 304, which receives the null message, transfers the null flow-mod message to the determination unit 305.

On the other hand, when the data portion is not the predetermined message which the OFASC 111 and the OFASC 112 should process, that is, when the data portion is a predetermined message which the OFCI 113 should process, the receiving packet processing unit 302 transfers the message to the OF message generating unit 304.

The OF message generating unit 304 carries out a processing of OpenFlow, generates a message, and transfers the message to the determination unit 305. Similarly to the OF message generating unit 204, the OF message generating unit 304 is also a message generating unit or a message generating means.

The OF message receiving unit 306 receives a message from the OFASC 112 (that is, just front OFASC). Then, the OF message receiving unit 306 transfers the received message to the determination unit 305. Similarly to the OF message receiving unit 206, the OF message receiving unit 306 is also a message receiving unit or a message receiving means.

The determination unit 305 processes the message received from the message receiving unit 306, and the other message received from the OF message generating unit 304.

That is, when the message received from the OF message generating unit 304 is valid, the determination unit 305 discards the message received from the message receiving unit 306. Then, the determination unit 305 transfers the message, which is received from the OF message generating unit 304, to the management unit 307.

On the other hand, when the message received from the OF message generating unit 304 is invalid, the determination unit 305 transfers the message, which is received from the OF message receiving unit 306, to the management unit 307.

That is, similarly to the determination unit 205, the determination unit 305 transfers the message of the own apparatus to the management unit 307 when the message of the own apparatus is valid, and transfers the message of the just front apparatus to the management unit 307 when the message of the own apparatus is invalid.

The management unit 307 compares a cookie, which is set in the received flow-mod, with a cookie which is registered with a table held in advance, and checks whether the information of the coolie is registered or not. This check is carried out for checking whether a flow, which is set by the OFASC 112 having high priority, is rewritten by a flow which is set by the OFASC 111 having low priority, or not. Especially, when a flow which instructs a denial setting is changed to instructing an allowance setting, the management unit 307 must pay attention so that a setting, which has been set already by the OFASC 112 having high priority, may not be rewritten by a setting which is carried out by the OFASC 111 having low priority. When the information of the cookie having high priority is registered, the management unit 307 discards the allowance setting which is carried out by the OFASC 111 having low priority. In the case of registration of a new flow, or in the case of a valid message, the management unit 307 sends the message to the OFS 21 through the sending unit 308, and registers the flow with the OFS 21.

The management unit 307 sets an apparatus, which sets a flow to the OFS 21, to the cookie of the table.

(Explanation of Applications)

Next, the applications, which are used in the above-mentioned explanation, will be explained.

(1) Stateful FW

The Stateful FW is a fire wall (FW) including a dynamic setting function in that, when detecting a packet which goes to a network existing outside the OFN 141, a packet which goes in an inner direction against the out-going packet is allowed. According to the Stateful FW, it is possible to block communication which connects directly from the outside, and to allow only necessary communication. At a time of doing P-in into the OFASC 112 in which the Stateful FW works, the information processing system 100 of the present exemplary embodiment can register a flow which allows communication coming from a destination of the packet, which is related to P-in, in a direction reverse to a direction of the packet which is related to P-in.

It is necessary for the usual OF to carry out the P-in processing even to communication which returns from a communication destination server, and to carry out the processing of passing through a predetermined FW. However, the information processing system 100 of the present exemplary embodiment can register a return flow with the OFS 21 at a time of sending the packet. Therefore, it is unnecessary for the return communication to pass through FW. As mentioned above, the information processing system 100 can realize efficient communication.

(2) Load Balancer

When a plurality of Web servers are arranged redundantly outside the OFN 141, the Load Balancer of the present exemplary embodiment determines a connection destination. When a packet, which is addressed to a Web server (port number of L4 is 80 or 443), does P-in, the Load Balancer of the OFASC 111 determines a connection destination on the basis of predetermined algorithm. The information processing system 100 sets the flow, which is toward the determined connection destination, to the OFS 21. On the basis of the setting, after this time, the terminal apparatus 121 can communicate with an external WEB server on the basis of the flow information, which is registered with the OFS 21, without passing through the Load Balancer.

(3) Contention of Flow Setting from the Applications

It is assumed that both of the OFASC 111 and the OFASC 112 intend to carry out the flow setting for one P-in. In this case, according to the information processing system 100 of the present exemplary embodiment, the flow setting of the OFASC 112 (that is, the Stateful FW), which is arranged at a rear position, is given high priority. On the other hand, the flow setting of the OFASC 111 (that is, the Load Balancer), which is arranged in front of the OFASC 112, is discarded. As mentioned above, the information processing system 100 sets the setting of application having high priority to the OFS 21.

Moreover, a packet of the Load Balancer reaches a destination on the basis of the Packet-out message of Open-Flow. Therefore, the flow of the OFASC 111 (that is, the Load Balancer) is reflected in the OFS 21 by an operation on P-in of a next coming-in packet. As mentioned above, the information processing system 100 can input the setting of the OFASC 111, which is carried out by the application having low priority, into the OFS 21.

(Explanation on Effects)

Effects of the present exemplary embodiment will be explained in the following.

Firstly, the information processing system 100 can take an effect of setting the flow of OpenFlow adequately.

The reason will be shown in the following.

The OFASC 111 and the OFASC 111 which are first control apparatuses are connected with each other in series in the order of priority of the applications which are carried out by OFASCs. The determination unit 205 of the OFASC 112 having high priority discards the message of the OFASC 111, which has low priority and which is arranged in from of the OFASC 112, when the message on the result of process carried out to P-in of the own apparatus is valid, and sends the message of the own apparatus to a next apparatus (that is, the OFCI 113). That is, the valid message of the OFASC 112, which has the highest priority, is transferred to the OFCI 113.

Similarly to the determination unit 205, the determination unit 305 of the OFCI 113, which is a second control apparatus, transfers the message of the own apparatus to the management unit 307 when the message of the own apparatus is valid. Alternatively, the determination unit 305 transfers the message of the OFASC 112 to the management unit 307 when the message of the own apparatus is invalid. The above mention is the reason.

That is, the reason is that, since the OFASC 111 and the OFASC 112 of the information processing system 100 send the message with the bucket-brigade method in an order of low priority of the apparatus, the flow based on the message of the apparatus having high priority is sent to the OFS 21.

On the basis of the above-mentioned operation, the information processing system 100 can avoid failure in acquisition of the process results of the OFASC 111 and the OFASC 112, and can prevent the contradictory flow from being inputted into the OFS 21. Moreover, the information processing system 100 can prevent that the flow which is set by the OFASC 112 having high priority is rewritten by the OFASC 111 having low priority.

Moreover, the information processing system 100 can take an effect of reducing a load of the OF-Ch 131 on the basis of the above-mentioned configuration.

The reason will be shown in the following.

The information processing system 100 can input the process results of the OFASC 111 and the OFASC 112 directly from OFI (the OFCI 113) into the OFS 21. Therefore, when an application which controls bidirectional communication like the Stateful FW, the information processing system 100 can register the flow, which 'return packet' requires, with the OFS 21 on the basis of 'going packet' which is related to P-in. When a large amount of flow registration and many changes are generated, congestion is caused in the OF-Ch 131. The OF-Ch 131 has a possibility that the congestion causes a fault. However, since the information processing system 100 can set the flow of 'return packet' on the basis of 'going packet', it is possible to reduce a load of the OF-Ch 13.

Moreover, the information processing system 100 can take an effect of reducing a load of the application.

The reason will be shown in the following.

In the information processing system 100, a plurality of AppSVs 203 can operate in parallel. Then, the information processing system 100 makes it possible to carry out a processing of the AppSV 203, which has a heavy load, or a processing of the AppSV 203, which requires a dedicated apparatus, outside OFI (the OFCI 113). Even in the case, the information processing system 100 can maintain consistency of the flow. The above mention is the reason.

[Modification]

As above-mentioned, the OFASC 111, the OFASC 112, and the OFCI 113 (hereinafter, collectively called control apparatus) have the following configuration.

For example, each component of the control apparatus may have a configuration including a hardware circuit.

The control apparatus may have a configuration including a plurality of information processing apparatuses which are implemented by connecting the components of the control apparatus each other through a network or a bus.

The control apparatus may have a configuration that a plurality of components are realized by one piece of hardware.

The control apparatus may be realized as a computer apparatus which includes a CPU (Central Processing Unit), a ROM (Read Only Memory) and a RAM (Random Access Memory). The control apparatus may be realized as a computer apparatus which, in addition to the above-mentioned configuration, further includes an IOC (Input/Output Circuit) and a NIC (Network Interface Circuit).

Figure 6:
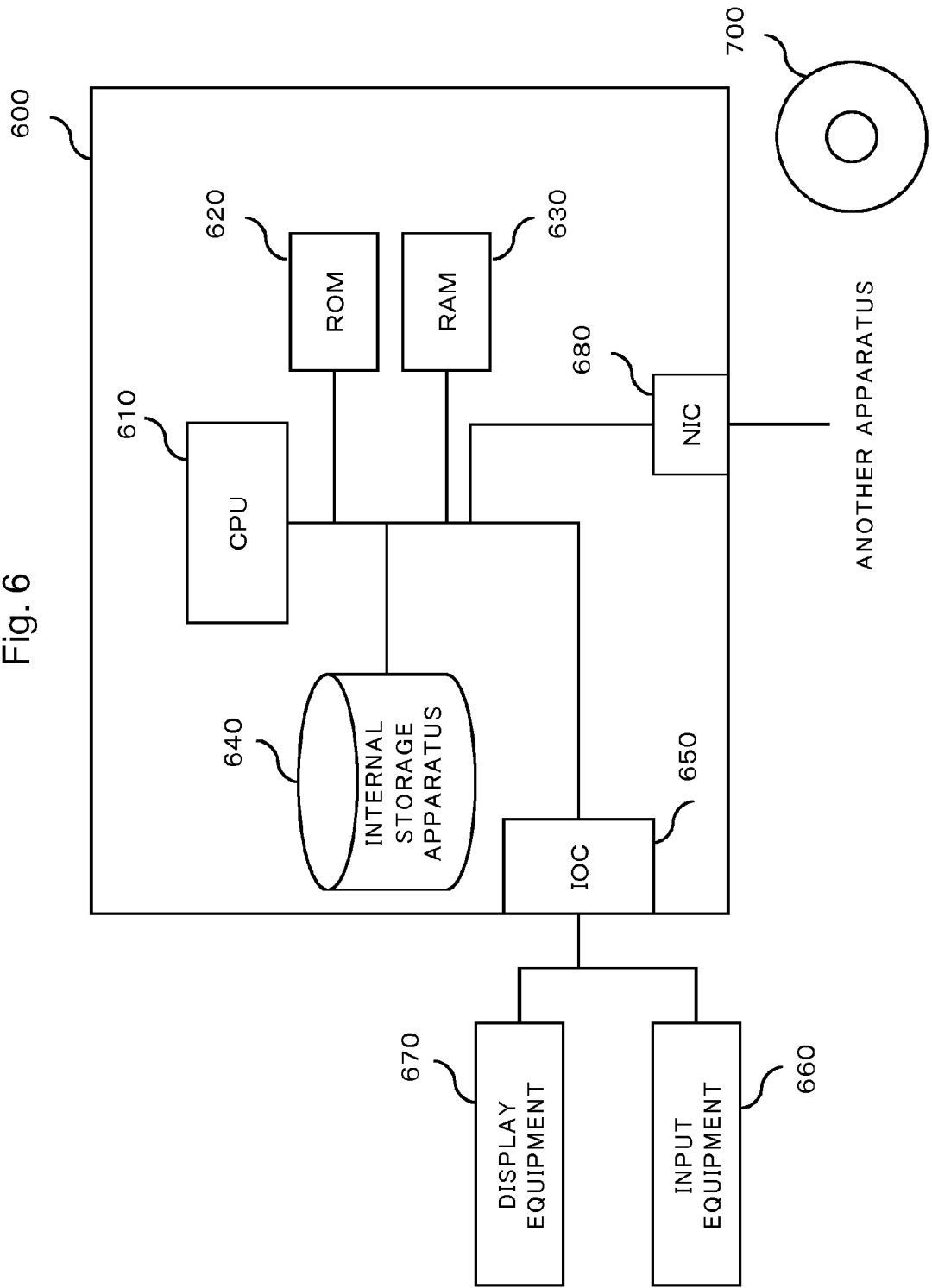
FIG. 6 is a block diagram showing an example of another configuration of each of OFASC and OFCI according to the first exemplary embodiment.

FIG. 6 is a block diagram showing an example of an information processing apparatus 600 according to a modification of the control apparatus.

The information processing apparatus 600 includes a CPU 610, a ROM 620, a RAM 630, an internal storage apparatus 640, an IOC 650, and a NIC 680, and composes a computer apparatus.

The CPU 610 reads a program from the ROM 620. Then, the CPU 610 controls the RAM 630, the internal storage apparatus 640, the IOC 650, and the NIC 680 on the basis of the read program. A computer including the CPU 610 controls these components, and realizes each function of the units shown in FIG. 4 and FIG. 5. Each of the units shown in FIG. 4 is corresponding to the P-in receiving unit 201, the receiving packet processing unit 202, the AppSV 203, the OF message generating unit 204, the determination unit 205, the OF message receiving unit 206, and the sending unit 208. Moreover, each of units shown in FIG. 5 is corresponding to the P-in receiving unit 301, the receiving packet processing unit 302, the OF message generating unit 304, the determination unit 305, the OF message receiving unit 306, the management unit 307, and the sending unit 308.

The CPU 610 may use the RAM 630 or the internal storage apparatus 640 as a temporary storage medium of the program at a time when realizing each function.

Moreover, the CPU 610 may read a program, which is stored in a storage medium 700 so as to be computer-readable, by using a storage medium reading apparatus which is not shown in the drawing. Alternatively, the CPU 610 may receive a program from an external apparatus, which is not shown in the drawing, through the NIC 680, and store the program in the RAM 630, and operate on the basis of the stored program.

The ROM 620 stores the program which the CPU 610 executes, and fixed data. The ROM 620 is, for example, a P-ROM (Programmable-ROM) or a flash ROM.

The RAM 630 temporarily stores the program which the CPU 610 executes, and the data. The RAM 630 is, for example, a D-RAM (Dynamic-RAM).

The internal storage apparatus 640 stores data and a program which the information processing apparatus 600 holds for a long term. Moreover, the internal storage apparatus 640 may work as a temporary storage apparatus of the CPU 610. The internal storage apparatus 640 is, for example, a hard disk apparatus, a magneto optical disk apparatus, a SSD (Solid State Drive) or a disk array apparatus.

The ROM 620 and the internal storage apparatus 640 are non-transitory storage media. On the other hand, the RAM 630 is a transitory storage medium. The CPU 610 can operate on the basis of the program which is stored in the ROM 620, the internal storage apparatus 640, or the RAM 630. That is, the CPU 610 can operate by using the non-transitory storage medium or the transitory storage medium.

The IOC 650 mediates data between the CPU 610 and input equipment 660, and between the CPU 610 and display equipment 670. The IOC 650 is, for example, an IO interface card or a USB (Universal Serial Bus) card.

The input equipment 660 is equipment which receives an input instruction issued by an operator of the information processing apparatus 600. The input equipment 660 is, for example, a key board, a mouse, or a touch panel.

The display equipment 670 is equipment which displays information for the operator of the information processing apparatus 600. The display equipment 670 is, for example, a liquid crystal display.

The NIC 680 intermediates data with an external apparatus, which is not shown in the drawing, through a network. The NIC 680 is, for example, a LAN (Local Area Network) card.

The information processing apparatus 600, which has the above-mentioned configuration, can achieve the same effect as the OFASC 111, the OFASC 112, and the OFCI 113.

The reason is that the CPU 610 of the information processing apparatus 600 can realize the same functions as ones of the OFASC 111, the OFASC 112, and the OFCI 113.

The information processing apparatus 600 may realize functions of plural apparatuses, which work as the OFASC 111, the OFASC 112, and the OFCI 113, by executing a plurality of programs.

<Second Exemplary Embodiment>

According to the first exemplary embodiment, each of the OFASC 111 and the OFASC 112 includes the AppSV 203. However, an installation position of the AppSV 203 is not limited to the above mention. For example, the OFCI 113 may include the AppSV 203.

For example, when number of the OFASCs 112 becomes increasing and a configuration includes a multistage connection of the OFASCs 112, it is estimated that a period of time from inputting P-in from the OFS 21 until writing the message in the OFS 21 becomes long. Therefore, it is desired to reduce a time for setting a result of an AppSV 203 which has high priority because of having a relation to security or the like.

Then, as a second exemplary embodiment, when the OFCI 113 includes the AppSV 203 will be explained in the following.

Figure 7:
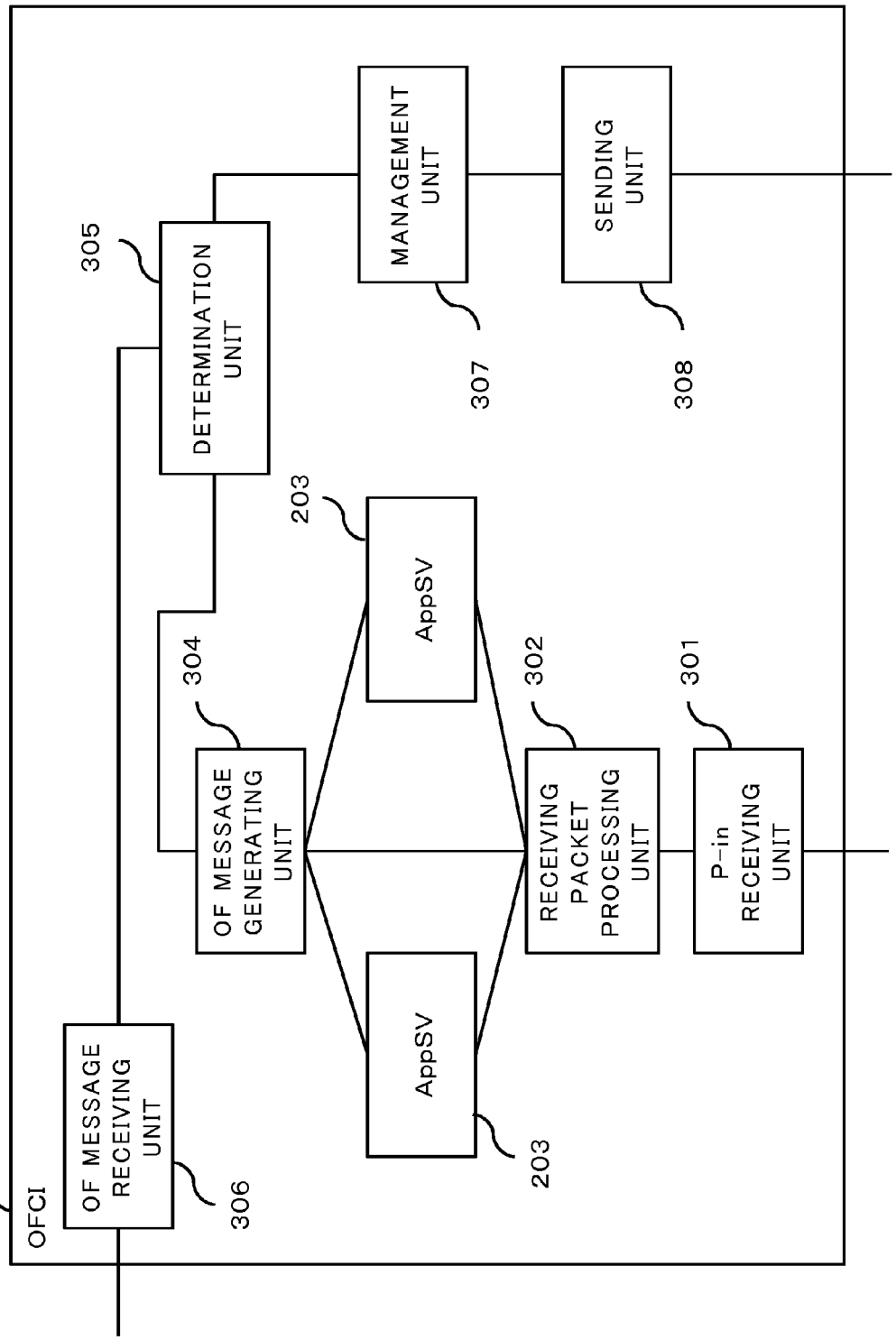
FIG. 7 is a block diagram showing an example of a configuration of OFCI according to a second exemplary embodiment.

FIG. 7 is a block diagram showing an example of a configuration of an OFCI 114 according to the second exemplary embodiment.

The OFCI 114 of the present exemplary embodiment includes one or more the AppSVs 203 in addition to the configuration of the OFCI 113 of the first exemplary embodiment. Since the configuration of the OFCI 114 is the same as one described in the first exemplary embodiment, detailed explanation on the configuration is omitted. Moreover, since an operation of the OFCI 114 is the same as one of the OFCI 113 except for an operation related to the AppSV 203, an operation related to the AppSV 203 will be mainly explained.

As the AppSV 203 which is included in the OFCI 114, an application which has high priority from a view point of security, for example, an application which has a necessity of inputting a flow of a blocking type is assumed. On the other hand, an application, which requires a heavy load processing, may be included in an apparatus, which is arranged outside the OFCI 114, such as the OFASC 111.

(Explanation on Operation of OFCI 114)

Explanation on an operation, which is the same as one described in the first exemplary embodiment, is omitted adequately, and a peculiar operation of the present exemplary embodiment will be explained mainly.

The OFCI 114 holds port numbers (L4) of applications, which are used in the AppSVs 203 included in the OFASC 111 and the OFASC 112, and the AppSV 203 included in the OFCI 114, in advance.

Since a P-in receiving unit 301, a determination unit 305, an OF message receiving unit 306, a management unit 307, and a sending unit 308 of the present exemplary embodiment are the same as ones in the first exemplary embodiment, detailed explanation on these components is omitted.

In the case of a message which should be processed by the AppSV 203 included in the OFCI 114, the receiving packet processing unit 302 transfers the message to the AppSV 203. Since other operations of the receiving packet processing unit 302 are the same as the operations of the receiving packet processing unit 302 in the first exemplary embodiment, detailed explanation on the operations is omitted.

The AppSV 203 transfers a processing result to the OF message generating unit 304.

When the OF message generating unit 304 receives the message from the AppSV 203, the OF message generating unit 304 generates the flow-mod message on the basis of the message from the AppSV 203. At this time, the OF message processing unit 303 sets the cookie so as to be able to identify the AppSV 203 which has carried out the processing. The bit of the cookie in the present exemplary embodiment may be the same as one in the first exemplary embodiment. However, the OFCI 114 may set the cookie so as to be able to identify the AppSV 203 which is included in the OFCI 114. Since other operations of the OF message processing unit 303 are the same as the operations of the OF message processing unit 303 in the first exemplary embodiment, detailed explanation on the operations is omitted.

In addition to the effect of the first exemplary embodiment, the present exemplary embodiment can achieve an effect that it is possible to adequately apply the flow corresponding to the AppSV 203 which has high priority because of having a relation to security or the like.

The reason will be shown in the following.

The OFCI 114 includes the AppSV 203 which has high priority. Therefore, a function of the OFCI 114 as OFI can apply a result of the AppSV 203, which has high priority, to the OFS 21 without passing through another apparatus. The above mention is the reason.

An example of effect according to the present invention is to set the flow of OpenFlow adequately.

On the other hand, according to OpenFlow which is described in Japanese Patent Laid-open No. 2011-166384, path control is carried out by using fields (Match Field) of L1 to L4 of the communication packet.

However, in OpenFlow which is described in Japanese Patent Laid-open No. 2011-166384, a control method for processing of equal to or upper layer of L5 is the same as the usual network control method. For example, communication, which uses an AppSV (an Application Server) of equal to or upper layer of L5, must always reach an AppSV which the communication uses.

Figure 8:
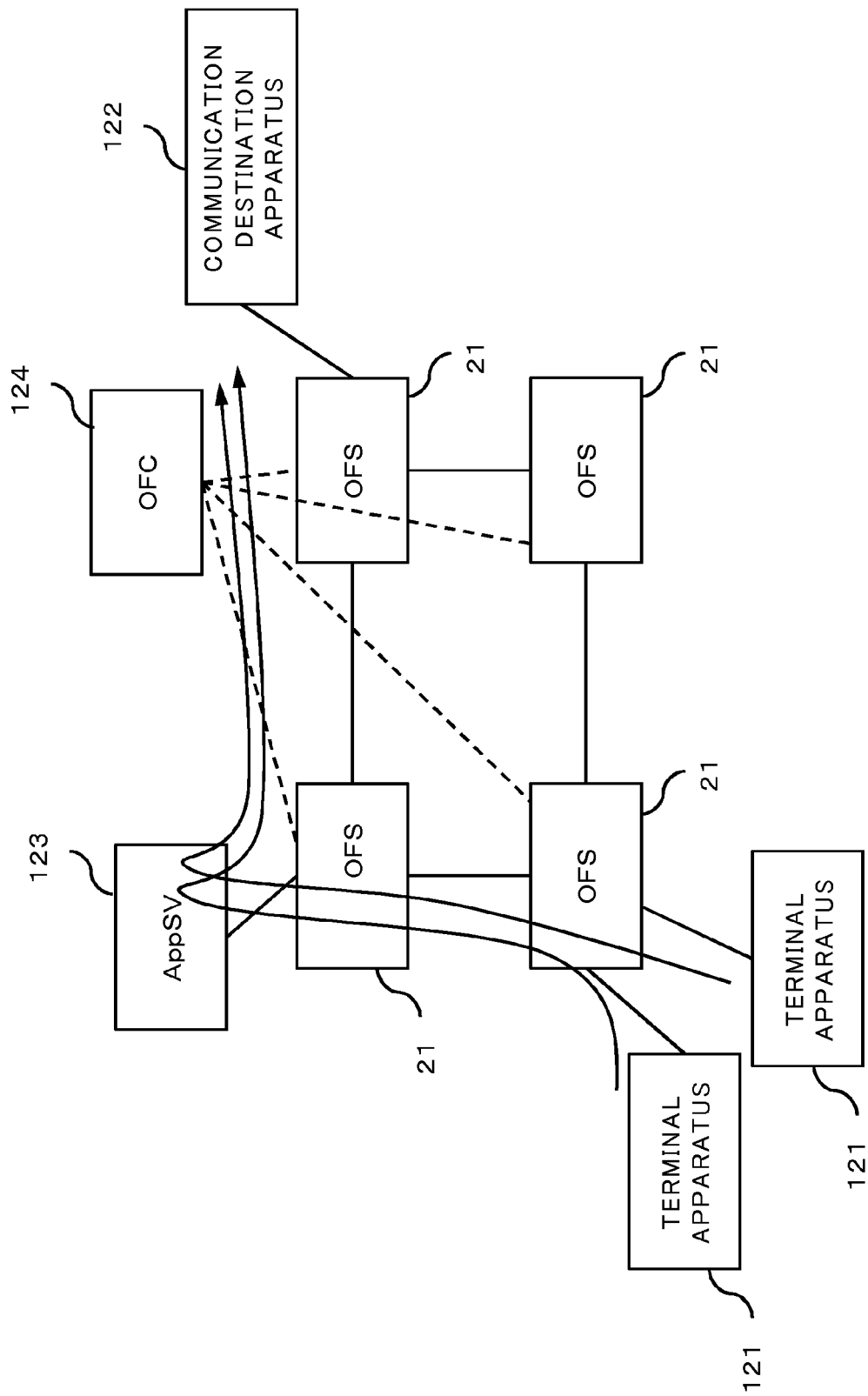
FIG. 8 is a diagram showing an example of a path which passes through AppSV of equal to or upper layer of L5.

FIG. 8 is a diagram showing an information processing system of OpenFlow which is in the above-mentioned state.

Paths from two terminal apparatuses 121 to the communication destination apparatus 122 must pass through the AppSV 123. Therefore, as shown in FIG. 8, the OFC 124 instructs communication calls, which are originated by two terminal apparatuses 121, to follow paths which pass through the AppSV 123. In this case, as shown in FIG. 8, the paths to the AppSV 123 are not distributed.

According to the art which is described in Japanese Patent Laid-open No. 2011-166384, in order to distribute the paths which are directed to the AppSV 123, it is necessary to set up a redundant configuration regarding the AppSV 123, for example, to distribute installation locations of the plural AppSVs 123 physically. Therefore, according to the art which is described in Japanese Patent Laid-open No. 2011-166384, the communication which uses the AppSV 123 of equal to or upper layer of L5 cannot achieve the merit of OpenFlow.

As a method to improve the above-mentioned problem and consequently to improve efficiency, for example, a method to input a result of processing of equal to or upper layer of L5, which is carried out by the AppSV 123, directly into the OFC 124 is conceivable.

Figure 10:
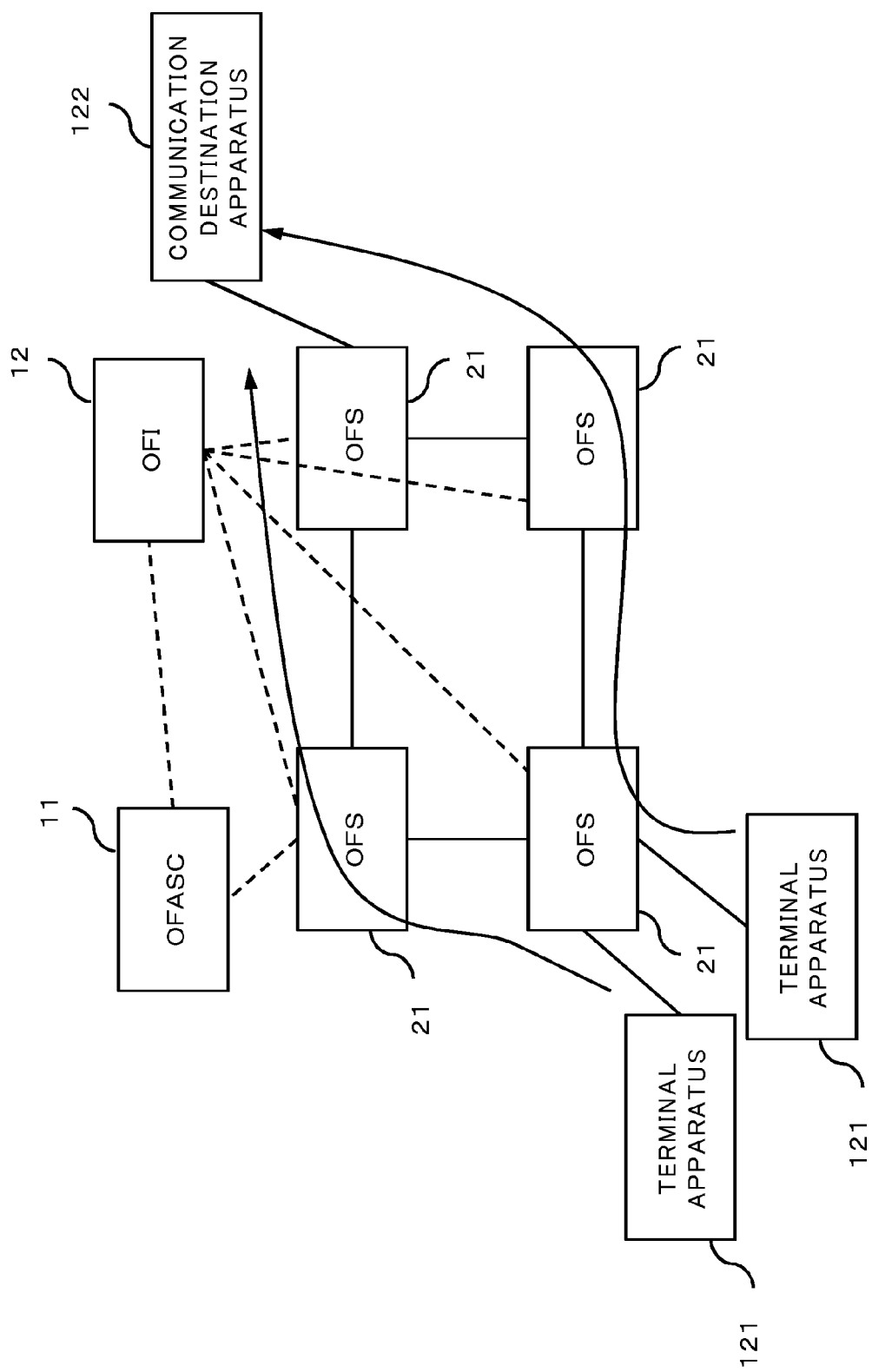
FIG. 10 is a diagram showing an example of a path of equal to or upper layer of L5 when using OFASC.

For example, an information processing system shown in FIG. 10 includes the OFASC (Open Flow Application Server Controller) 11 which is corresponding to the AppSV 123 with a function of a controller (function of the OFC 124). Then, a flow, which is a result of processing which the OFASC 11 carries out as the AppSV 123 and the OFC 124, is registered with the OFS 21 through the OFI (OpenFlow Installer) 12. This method is a method of converting the result of the processing of equal to or upper layer of L5 into L1 to L4 in order to make the process controlled by OpenFlow.

However, this method causes a problem when this method is applied to a plurality of the OFASCs 11. That is, when one unknown packet does P-in from the OFS 11, which is Ingress, to each of the plural OFASCs 11, each of the OFASCs 11 registers a result, which is acquired by processing the packet, with the OFS 21 as a flow. However, there is no means to align the flows which the plural OFASCs 11 input. For example, it is assumed that a certain OFASC 11 inputs a flow, which blocks a packet from a view point of security, into the OFI 12. Furthermore, it is assumed that another OFASC 11 inputs a flow, which makes the packet pass, into the OFI 12. At this time, an order of flow's arrival timing is not guaranteed. Therefore, a case that the latter (pass) rewrites the former due to a difference in the flow's arrival timing is caused. A security risk that the packet, which should not pass, passes consequently may be caused in some cases.

Figure 9:
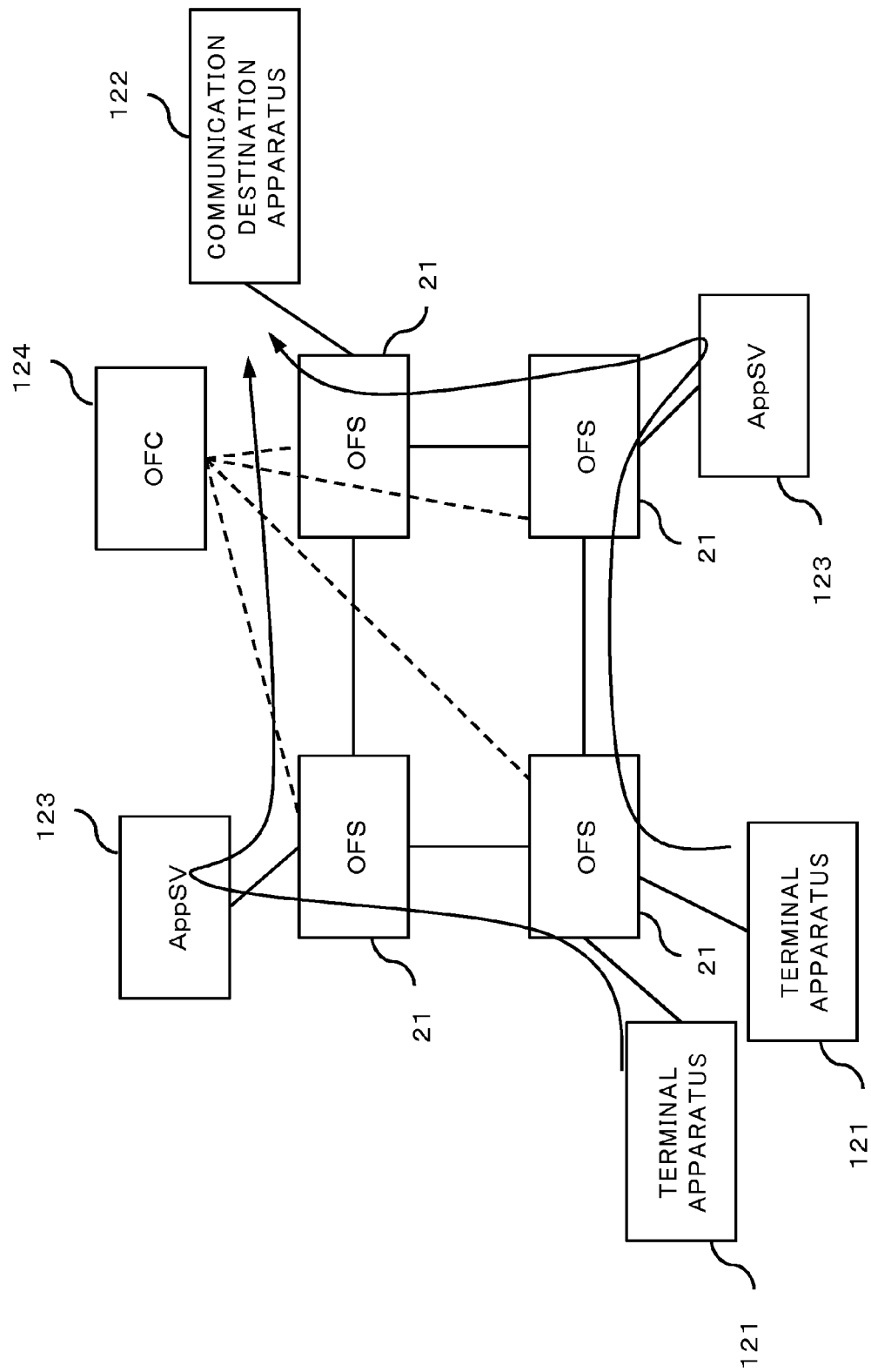
FIG. 9 is a diagram showing an example of a path which passes through a plurality of AppSVs of equal to or upper layer of L5.

That is, when a plurality of controllers (the OFASC 11 in FIG. 9) receives a P-in message (Packet-in message) from one OFS and process the P-in message, the art described in Japanese Patent Laid-open No. 2011-166384 has not a means which aligns a process result of each controller. Therefore, there is a possibility that a contradictory or unfair result is registered when the flow is inputted into OFSs. For example, a problem that a packet, which should not pass, flows consequently may be caused in some cases. Alternatively, a possibility that an unexpected operation is carried out is conceivable.

OpenFlow whose version is 1.2 or subsequent ones specifies operations of the plural controllers. But, a cooperative operation among the controllers is not specified as protocol. Therefore, the cooperative operation among the plural controllers which OpenFlow specifies is not prevailing.

Moreover, one P-in from the OFS 21 is inputted into each of the OFASC 11. However, the OFI 12 has no means which grasps a state of each of the OFASC 11 which is carrying out the process. As a result, for example, when the flow-mod message does not arrive, the OFI 12 cannot determine whether the OFASC 11 neglects P-in since P-in is unnecessary, or the processing of the OFASC 11 is delayed.

As mentioned above, the art described in Japanese Patent Laid-open No. 2011-166384 has a problem that it is impossible to secure the order of arrival timing of the flow from each of the plural OFASC 11. In other words, the art described in Japanese Patent Laid-open No. 2011-166384 has a problem that it is impossible to set the flow of OpenFlow adequately.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary Note 1)

A first control apparatus includes:

a first receiving unit which receives a second message from any one of a plurality of switch apparatuses which constructs an OpenFlow network which is a connection path which connects a terminal apparatus which is a sending source of information with a communication destination apparatus which is a destination of the information;

a first receiving packet processing unit which processes the second message;

a first application executing unit which executes a first application which is corresponding to the second message;

a first message generating unit which receives a message from the first receiving packet processing unit and a message from the first application executing unit, and generates a first message;

a first message receiving unit which receives a first message from another first control apparatus;

a first determination unit which selects any one of the first message which is received from the first message generating unit and the first message which is received from the first message receiving unit on the basis of the first message which is received from the first message generating unit; and a first sending unit which sends the first message which is selected by the first determination unit.

(Supplementary Note 2)

The first control apparatus according to supplementary note 1, wherein the first message receiving unit receives the first message which includes a result of executing the second application from another first control apparatus which carries out a second application having lower priority, and the first determination unit selects the message which includes a result of executing the first application when the application executing unit executes a first application which has higher priority than the second application has, and selects the first message which is received by the first message receiving unit when the application executing unit does not execute the first application.

(Supplementary Note 3)

A second control apparatus connected with the first control apparatus according to supplementary note 1, includes:

a second message receiving unit which receives the first message from the first control apparatus;

a second receiving unit which receives the second message from the switch apparatus;

a second receiving packet processing unit which processes the second message;

a second message generating unit which receives a message from the second receiving packet processing unit, and generates a first message;

a second determination unit which selects any one of the first message which is received from the second message generating unit and the first message which is received from the second message receiving unit, on the basis of the first message which is received from the second message generating unit;

a first sending unit which sends the message which is selected by the second determination unit;

a management unit which compares priority of a first control apparatus which has already sent a message used for setting the switch apparatus, and priority of the message selected by the second determination unit, and selects the message selected by the second determination unit as the message used for setting the switch apparatus when the priority of the message selected by the second determination unit is higher than the first control apparatus; and a second sending unit which sends the message, which is selected by the management unit, to the switch apparatus in order to set an OpenFlow network function to the switch apparatus on the basis of the first message.

(Supplementary Note 4)

The second control apparatus according to supplementary note 3, further includes:

a second application executing unit which executes an application which is corresponding to the second message.

(Supplementary Note 5)

An information processing system, includes:

a terminal apparatus which is a communication source of information;

a communication destination apparatus which is a communication destination of the information;

a plurality of switch apparatuses which constitutes an OpenFlow network which is a path between the terminal apparatus and the communication destination apparatus;

a plurality of first control apparatuses each of which executes a predetermined application, generates a first message which is used for control of the OpenFlow network on the basis of a result of executing the application, and sends the first message logically in series in an order of priority of the application; and a second control apparatus which sets an OpenFlow network function to the switch apparatus on the basis of the first message.

(Supplementary Note 6)

A control method, includes:

receiving a second message from any one of a plurality of switch apparatuses which constructs an OpenFlow network which is a connection path which connects a terminal apparatus which is a sending source of information with a communication destination apparatus which is a destination of the information;

processing the second message;

executing a first application which is corresponding to the second message;

receiving a message including a result of processing the second message and a message including a result of the application, and generating a first message;

receiving a first message from another first control apparatus;

selecting any one of a first message which is received from the other first control apparatus and the first message which is generated on the basis of the generated first message; and sending the selected first message.

(Supplementary Note 7)

A computer readable non-transitory medium embodying a program, the program causing a computer to perform a method, the method includes:

receiving a second message from any one of a plurality of switch apparatuses which constructs an OpenFlow network which is a connection path which connects a terminal apparatus which is a sending source of information with a communication destination apparatus which is a destination of the information;

processing the second message;

executing a first application which is corresponding to the second message;

receiving a message including a result of processing the second message and a message including a result of the application, and generating a first message;

receiving a first message from another first control apparatus;

selecting any one of a first message which is received from the other first control apparatus and the first message which is generated on the basis of the generated first message; and sending the selected first message.

The invention claimed is:

1. A first control apparatus, comprising:
a processor and a memory connected to the processor and storing a program, wherein the processor reads the program and performs functions, the functions includes:
   a first receiving unit which receives a first message from one of a plurality of switch apparatuses which constructs an OpenFlow network which is a connection path which connects a terminal apparatus which is a sending source of information with a communication destination apparatus which is a destination of the information;
   a first receiving packet processing unit which processes the first message;
   a first application executing unit which executes a first application which is corresponding to the first message;
   a second message generating unit which receives a message from the first receiving packet processing unit and a message from the first application executing unit, and generates a second message;
   a second message receiving unit which receives a second message from another first control apparatus;
   a first determination unit which selects any one of the second message which is received from the second message generating unit and the second message which is received from the second message receiving unit on the basis of the second message which is received from the second message generating unit; and
   a first sending unit which sends the second message which is selected by the first determination unit.

2. The first control apparatus according to claim 1, wherein the second message receiving unit receives the second message which includes a result of executing the second application from another first control apparatus which carries out a second application having lower priority, and
wherein the first determination unit selects the message which includes a result of executing the first application when the application executing unit executes a first application which has higher priority than the second application has, and selects the second message which is received by the second message receiving unit when the application executing unit does not execute the first application.

3. A control method, comprising:
receiving a first message from any one of a plurality of switch apparatuses which constructs an OpenFlow network which is a connection path which connects a terminal apparatus which is a sending source of information with a communication destination apparatus which is a destination of the information;
processing the first message;
executing a first application which is corresponding to the first message;
receiving a message which is the processed first message and a message from the first application, and generating a second message;
receiving a second message from another first control apparatus;
selecting one of the generated second message and the second message which is received from another first control apparatus on a basis of the generated second message; and
sending the selected second message.

4. A non-transitory computer readable medium embodying a program, the program causing a computer to perform:
receiving a first message from one of a plurality of switch apparatuses which constructs an OpenFlow network which is a connection path which connects a terminal apparatus which is a sending source of information with a communication destination apparatus which is a destination of the information;
processing the first message;
executing a first application which is corresponding to the first message;
receiving a message which is the first message and a message from the first application, and generating a second message;
receiving a second from another first control apparatus;
selecting one of the generated second message and the second message which is received from another first control apparatus on a basis of the generated second message; and
sending the selected second message.

* * * * *